US008485808B2

(12) United States Patent
Amaya et al.

(10) Patent No.: US 8,485,808 B2
(45) Date of Patent: Jul. 16, 2013

(54) APPARATUS FOR PRODUCING THREE-DIMENSIONAL SHAPED PRODUCT

(75) Inventors: Koichi Amaya, Fukui (JP); Yukinori Urushizaki, Fukui (JP); Hideto Matsubara, Fukui (JP)

(73) Assignee: Matsuura Machinery Corp., Fukui-shi, Fukui (JP)

( * ) Notice: Subject to any disclaimer, the term of this patent is extended or adjusted under 35 U.S.C. 154(b) by 375 days.

(21) Appl. No.: 12/836,208

(22) Filed: Jul. 14, 2010

(65) Prior Publication Data

US 2011/0253035 A1    Oct. 20, 2011

(30) Foreign Application Priority Data

Apr. 14, 2010   (JP) .................................. 2010-092888

(51) Int. Cl.
*B29C 35/08* (2006.01)
(52) U.S. Cl.
USPC ...................... 425/174.4; 425/436 R; 264/497
(58) Field of Classification Search
USPC .............................. 425/174.4, 436 R; 264/497
See application file for complete search history.

(56) References Cited

U.S. PATENT DOCUMENTS

| 5,658,412 A | 8/1997 | Retallick et al. |
| 5,753,274 A | 5/1998 | Wilkening et al. |
| 5,846,370 A * | 12/1998 | O'Connor .................. 156/272.8 |
| 6,824,714 B1 * | 11/2004 | Turck et al. ................... 264/40.1 |
| 2007/0057412 A1 * | 3/2007 | Weiskopf et al. ............. 264/497 |

FOREIGN PATENT DOCUMENTS

| JP | 4-255327 A | 9/1992 |
| JP | 7-501765 A | 2/1995 |
| JP | 8-281807 A | 10/1996 |

* cited by examiner

*Primary Examiner* — James Sanders
(74) *Attorney, Agent, or Firm* — Richard M. Goldberg

(57) ABSTRACT

An apparatus for producing a three-dimensional shaped product in which a powder and a shaped article are loaded on a base plate, a frame body is installed upright on a table, a support projecting from the frame body and/or a restraining support provided at the top of the frame body are used to support the base plate, the base plate is supported by arranging the center of gravity of the base plate so as to be present, two or more recesses provided at the back of the base plate are fitted into two or more extension supports which cross each other and/or restraining supports, and projected parts provided on supports and/or wall parts of the frame body are contacted with horizontally surrounding parts of the base plate on both sides in the longitudinal direction of at least one recess among the recesses, thereby attaining the above object.

4 Claims, 13 Drawing Sheets

APPARATUS FOR PRODUCING THREE-DIMENSIONAL SHAPED PRODUCT

FIELD OF THE INVENTION

The present invention relates to an apparatus for producing a three-dimensional shaped product in which metal powder or non-metal powder loaded on a vertically movable table is laminated while being sintered by irradiating electromagnetic waves to each layer, thereby producing a predetermined three-dimensional shaped product.

DESCRIPTION OF THE RELATED ART

There have been proposed various configurations in technical fields where metal powder or non-metal powder is sintered by irradiation of electromagnetic waves such as laser beams or electron beams, thereby molding a three-dimensional shaped product. However, any configuration will always entail the following steps:
(a) a planarization step for spraying powder by allowing the powder to fall and sliding on the upper-side surface or in the vicinity of the thus sprayed powder,
(b) a step in which a region to be shaped is irradiated by electromagnetic waves such as laser beams or electron beams, thereby sintering the irradiated region, and
(c) a step in which the end part and/or the upper surface that have been sintered in the step (b) are cut with a rotating tool, thereby molding the end part and/or the upper surface, and the steps of (a), (b) and (c) are repeated to finally mold a necessary three-dimensional shape.

Where the step (c) is completed for a specific powder layer, the powder on or around an object to be shaped is decreased in height only by one layer and the step (a) is resumed on a next powder layer.

Therefore, the table which loads the powder is installed so as to move vertically.

Where a powder layer located at the lowest level is brought directly into contact with the upper surface of the table, the powder layer adheres to the upper surface of the table in the sintering step (b). Thereby, it is impossible to smoothly remove from the table an object which has been completely shaped.

In order to cope with the above situation, Patent Document 1 has adopted a configuration in which when powder is solidified by sintering ordinarily on the surface of a table (which is expressed as "support means 2" in Patent Document 1), a base plate is installed which is made by selecting a material adherable to the powder.

Ordinarily, an existing shaped part is influenced by the movement of a planarization apparatus in the step (a). Therefore, in order for the shaped part to be prevented from moving in a direction in which the apparatus moves, it is necessary that the base plate is kept stable on the surface of the table.

Due to the above-described necessity, in the configuration of Patent Document 1, the base plate is fixed by inserting a bolt through the table from below.

However, where the base plate is fixed to the table by using a support, thermal energy resulting from irradiation of electromagnetic waves or electron beams is dispersed by thermal conduction via the base plate and the table. Thereby, some trouble may take place in a case where powder is adhered to the base plate with a predetermined strength.

Further, it is troublesome to fix the table by inserting the bolt from below, and where the base plate is also integrally configured with the lower end part of a shaped object, there is inevitably found such an inconvenience that a bolt insertion hole remains.

PRIOR ART DOCUMENT

Patent Document

[Patent Document 1] Japanese Patent No. 4054075

DISCLOSURE OF THE INVENTION

Problems to be Solved by the Invention

An object of the present invention is to provide an apparatus for producing a three-dimensional shaped product in which a base plate is interposed between a portion which is a region to be sintered among individual powder layers and a table, and a constitution of the apparatus for producing a three-dimensional shaped product in which the base plate is installed so as to form a vertical space between the table and itself, thereby eliminating a necessity for inserting a bolt from the table into the surface of the base plate.

In order to attain the above object, the present invention provides the following basic configurations:
(1) an apparatus for producing a three-dimensional shaped product in which the following steps are sequentially repeated, that is, a step that metallic or non-metallic powder is sprayed on a base plate placed on the upper side of a vertically movable table in a shaping tank and having on the surface at least a material which can be adhered to the metallic or non-metallic powder upon solidification of the powder adjacent to the upper side by sintering and on the upper side of the table; a step that the upper-side surface of the thus sprayed powder is subjected to planarization and electromagnetic waves or electron beams are then irradiated along a layer having a predetermined thickness to a region to be shaped which is located at the uppermost position, thereby forming a sintered layer; and a step that the end part and/or the upper surface where the sintering has been performed are thereafter cut to effect molding, more particularly, the apparatus for producing a three-dimensional shaped product in which a frame body is installed upright on the table, an extension support projecting horizontally from the frame body and/or a restraining support provided on the top of the frame body are used to support the base plate, the base plate can be supported by arrangement so that the center of gravity of the base plate is present inside a triangle formed by three locations or a quadrangle formed by four locations inside a region in which the base plate is supported, two or more of the supports and/or restraining supports are installed so as to be crossed in the longitudinal direction, and recesses provided at the lower surface (undersurface) of the base plate are fitted into the thus crossed extension supports and/or restraining supports, thereby preventing the base plate from moving horizontally, and
(2) an apparatus for producing a three-dimensional shaped product in which the following steps are sequentially repeated, that is: metallic or non-metallic powder is sprayed on a base plate placed on the upper side of a vertically movable table in a shaping tank and having on the surface at least a material which can be adhered to the metallic or non-metallic powder upon solidification of the powder adjacent to the upper side by sintering and on the upper side of the table; a step that the upper-side surface of the thus sprayed powder is subjected to planarization and electromagnetic waves or electron beams are then irradiated along a layer having a predetermined thickness to a region to be shaped which is located at the uppermost position, thereby forming a sintered layer; and a step that the end part and/or the upper surface where the sintering has been performed are thereafter cut to effect molding, more particularly, the apparatus for producing a three-dimensional shaped product in which a frame body is installed upright on the table, an extension support projecting horizontally from the frame body and/or a restraining support provided on the top of the frame body are used to support the base plate, the base plate can be supported by arrangement so that the center of gravity of the base plate is present inside a triangle formed by three locations or a quadrangle formed by four locations inside a region in which the base plate is supported, recesses provided at the lower surface of the base plate are fitted into two or more of the extension supports and/or restraining supports, and on both sides of at least one recess in the longitudinal direction among these recesses, a projected part provided on the support and projecting at least upward and/or a wall part of the frame body are contacted with a horizontally surrounding part of the base plate, thereby preventing the base plate from moving horizontally.

BRIEF DESCRIPTION OF THE DRAWINGS

FIGS. 1(a), (b), (c) and (d) indicate states that powder is allowed to fall from a base plate and the powder supporting plate, and the powder is retained inside a table and a frame body.

FIGS. 5(a) and 5(c) are a plan view and a side cross-sectional view including fitted portions in a case where two recesses are fitted into one support and one restraining support orthogonal to the support, and FIGS. 5(b) and 5(d) are a plan view and a side cross-sectional view including fitted portions in a case where three recesses are fitted into three supports forming a crossing angle of 120 degrees in the longitudinal direction (it is noted that the dotted-line parts shown in each of the plan views show a state that the base plate is supported from below, which is similar in FIG. 6 through FIG. 11 to be described later).

FIGS. 6(a) and 6(c) are a plan view and a side cross-sectional view including fitted portions in a case where four recesses are fitted into four supports in which mutually adjacent supports form a crossing angle of 90 degrees in the longitudinal direction and FIGS. 6(b) and 6(d) are a plan view and a side cross-sectional view including fitted portions in a case where three recesses are fitted into two supports opposing each other and a restraining support orthogonal to these supports.

FIGS. 7(a) and 7(c) are a plan view and a side cross-sectional view including fitted portions in a case where one frame body is installed upright at the center of a table and fitted into two restraining supports which are orthogonal to each other at the top of the frame body, and FIGS. 7(b) and 7(d) are a plan view and a side cross-sectional view including fitted portions in a case where the recesses are fitted into a total of four restraining supports in which two sets of two mutually-opposing restraining supports are in parallel to each other or two sets of two mutually-adjacent restraining supports are orthogonal to each other.

FIGS. 9(a) and 9(c) are a plan view and a side cross-sectional view including fitted portions in a case where, among horizontally surrounding parts of the base plate, two sides orthogonal to the supports are contacted with four projected parts, and FIGS. 9(b) and 9(d) are a plan view and a side cross-sectional view including fitted portions showing a case where, among the horizontally surrounding parts of the base plate, two sides orthogonal to the supports are contacted with two wall parts.

FIGS. 10(a) and 10(c) are a plan view and a side cross-sectional view including fitted portions where, among horizontally surrounding parts of the base plate, two sides orthogonal to the support and the restraining support are contacted with two projected parts and FIGS. 10(b) and 10(d) are a plan view and a side cross-sectional view including fitted portions where, among the horizontally surrounding parts of the base plate, two sides orthogonal to the support and the restraining support are contacted with two wall parts of the base plate.

FIG. 13(a) is a plan view and FIG. 13(b) is a perpendicular side cross-sectional view.

FIG. 16(a) shows a case where the center of gravity is present inside the triangle formed by three locations and FIG. 16(b) shows a case where the center of gravity is in particular present at an intersecting point of diagonal lines in the quadrangle formed by four locations.

DESCRIPTION OF SYMBOLS

Figure 1A:
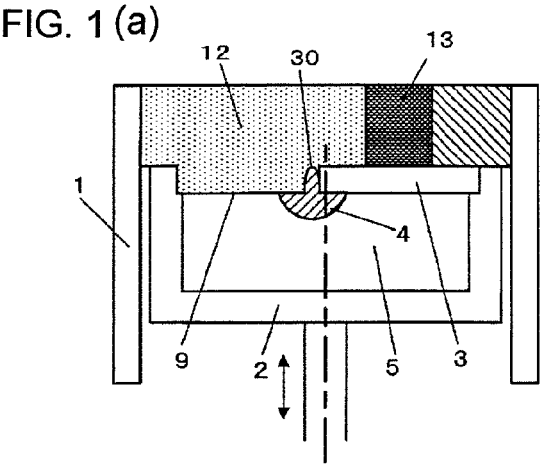
FIGS. 1(a)-1(d) are perpendicular side cross-sectional views showing a configuration of Example 1 where a powder supporting plate is used.

1: Shaping tank
2: Table
20: Insertion hole
21: Discharge opening
3: Base plate
30: Recess
31: Upper part of the base plate where powder is used
32: Metal plate which is the lower side of the base plate
4: Extension Support
5: Projected part
7: Frame body
8: Restraining Support
9: Powder supporting plate
10: Opening/closing plate
11: Perpendicular support
12: Powder
13: Shaped article

BEST MODE FOR CARRYING OUT THE INVENTION

Both the basic configurations (1) and (2) have such a requirement that a base plate 3 can be supported by an arrangement so that the center of gravity of the base plate 3 is present inside a triangle formed by three locations or a quadrangle formed by four locations inside a region where an extension support 4 and/or a restraining support 8 on which the base plate is supported. Specifically, as shown in all of the drawings, extension support 4 extends outwardly from a respective frame body 7, while restraining support 8 lies on top of a respective frame body 7, and in both cases, base plate 3 lies on top of the respective extension support 4 and/or restraining support 8 and the base plate has recesses that receive the respective extension support 4 and/or restraining support 8.

First, an explanation will be made for the gist of the requirement. Powder 12 and a shaped article 13 loaded on the base plate 3 are equal in weight per unit area.

Figure 16A:
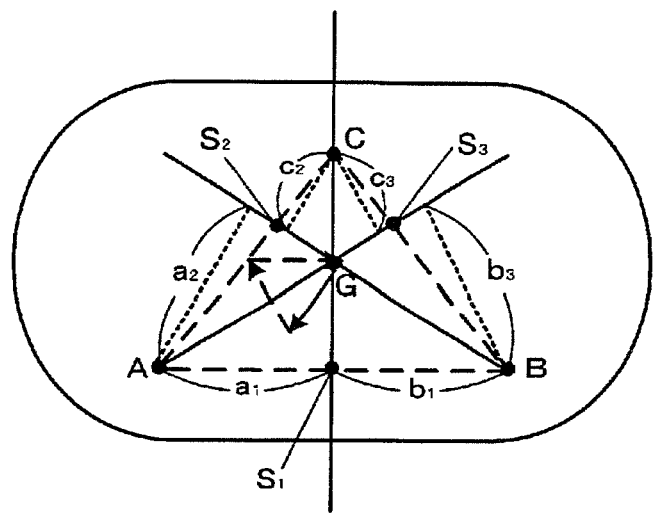
FIGS. 16(a) and 16(b) are plan views for explaining that the base plate can be supported by arrangement so that the center of gravity of the base plate is present inside a triangle formed by three locations or a quadrangle formed by four locations inside a region where the support and/or the restraining support on which the base plate is supported.

In this case, for example, as shown in FIG. 16(a), where the center of gravity (G) of the base plate 3 is present inside a triangle ABC formed by three locations (A, B, C) and also where an intersecting point of a straight line CG obtained by extending the location of C and the center of gravity (G) with a straight line AB obtained by connecting the location of A and the location of B is given as $S_1$, both sides of a straight line $CGS_1$ are equal in weight to one-side parts of the powder 12, a solid body and the base plate 3. Gravity acting on each of the powder 12, the shaped article 13 and the base plate 3 on both sides is kept balanced on the basis of the straight line $CGS_1$.

On the base plate 3, no rotational moment is generated which gives the straight line $CGS_1$ as a rotating center due to the gravity.

Herein, where drag forces for supporting a whole weight M at the location of A, the location of B and the location of C are respectively referred to as $M_A$, $M_B$, and $M_C$, a formula of $M_A+M_B+M_C=M$ is established.

On the other hand, where a distance between the straight line $CGS_1$ and the location of A and a distance between the straight line $CGS_1$ and the location of B are respectively given as $a_1$ and $b_1$, as described above, no rotational moment is generated. This means that a formula of $a_1M_A=b_1M_B$ is established.

Similarly, as shown in FIG. 16(a), where an intersecting point of an extension of a straight line BG with a straight line CA is given as $S_2$, and a distance between a straight line $BGS_2$ and the location of C and that between the straight line $BGS_2$ and the location of A are respectively given as $c_2$ and $a_2$, as with the straight line $CGS_1$, no rotational moment is generated which gives the straight line $BGS_2$ as a rotating center. Thus, a formula of $c_2M_C=a_2M_A$ is established.

Further, where an intersecting point of a straight line AG with a straight line BC is given as $S_3$ and a distance between a straight line $AGS_3$ and the location of B and that between the straight line $AGS_3$ and the location of C are respectively given as $b_3$ and $c_3$, a formula of $b_3M_B=c_3M_C$ is established.

On the basis of the above-described formulae, the following are obtained:

$$M_A=M/(a_1/b_1+a_2/c_2+1),$$

$$M_B=M/(b_1/a_1+b_3/c_3+1),$$

$$M_C=M/(c_2/a_2+c_3/b_3+1).$$

More specifically, where the center of gravity (G) of the base plate 3 is present inside the triangle ABC formed by the three locations (A, B, C), any one of $M_A$, $M_B$ and $M_C$ having a weight at the respective points of A, B and C is a positive value and not a negative value. Thus, the base plate 3 is supported stably without being accompanied by rotational moment.

The support 4 and/or the step portion are in reality continued. Since three locations of A, B and C are not supported in an isolated manner, it is as a matter of course possible to support the base plate 3 stably where the center of gravity (G) of the base plate 3 is present inside the triangle ABC formed by the three locations (A, B, C).

An explanation will be made for a case where the center of gravity (G) of the base plate 3 is located inside a quadrangle formed by four locations inside a region of the support 4 and/or the step portion. If the center of gravity (G) is located inside a triangle formed by three locations, among the four locations, as apparent from the explanation about three locations shown in FIG. 16(a), it is as a matter of course possible to support the base plate 3 stably.

Figure 16B:
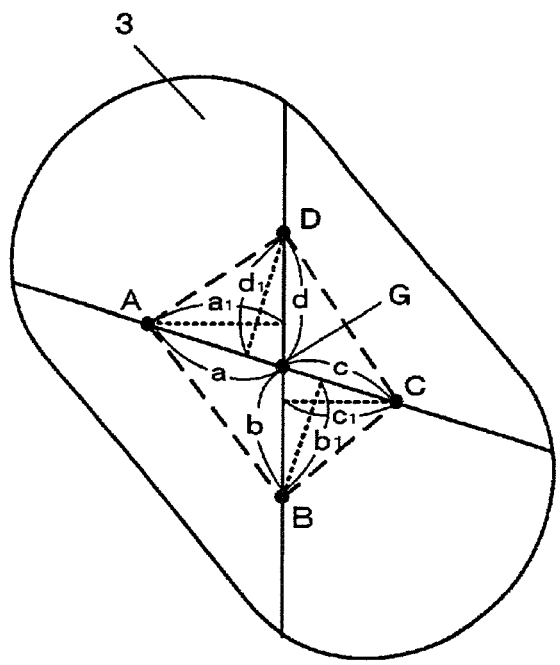

However, as shown in FIG. 16(b) in particular, where the center of gravity (G) of the base plate 3 is located inside the quadrangle ABCD formed by four locations (A, B, C, D) but the center of gravity (G) is present at an intersecting point (an intersecting point of the straight line AC with the straight line BD) of diagonal lines of the quadrangle ABCD, the center of gravity (G) is unable to locate inside any one of the triangles (triangles ABD, BAC, CBD and DAC) formed by three locations, among four locations. This needs particular consideration.

In FIG. 16(b), where drag forces supported by a whole weight M at the location of A, the location of B, the location of C and the location of D are respectively given as $M_A$, $M_B$, $M_C$ and $M_D$, and a distance between the location of the center of gravity (G) which is an intersecting point and the location of A, a distance between that and the location of B, a distance between that and the location of C, and a distance between that and the location of D are respectively given as a, b, c and d, a distance between the location of A and a diagonal line DGB and a distance between the location of C and the diagonal line DGB are respectively given as $a_1$ and $c_1$, and a distance between the location of B and a diagonal line AGC and a distance between the location of D and the diagonal line AGC are respectively given as $b_1$ and $d_1$, no rotational moment is generated, with each of the diagonal lines given as a rotating center. Therefore, the following formulae are established:

$$a_1 M_A = c_1 M_C \text{ and}$$

$$b_1 M_B = d_1 M_D.$$

Since the following formula is established:

$$a_1/a = c_1 c,$$

and the following formula is also established:

$$b_1/b = d_1 d,$$

the following formulae are finally established:

$$a M_A = b M_C$$

$$b M_B = b M_B.$$

As a matter of course, between each of the drag forces $M_A$, $M_B$, $M_C$, $M_D$ and the whole weight, the following formula is established:

$$M_A + M_B + M_C + M_D = M.$$

However, it is impossible to specify four drag forces, $M_A$, $M_B$, $M_C$, $M_D$ by referring only to the above three formulae.

On the assumption that the drag force $M_A$ is not a positive value but a relationship of $M_A = 0$ is established, there is no way but to give $M_C = 0$ on the basis of the above formulae.

The drag forces $M_A$, $M_B$, $M_C$ and $M_D$, are common in that they correspond to the respective locations of A, B, C, and D and the weights equal to the surrounding unit areas thereof. Thus, on the assumption that a relationship of $M_A = M_C = 0$ is established, $M_B$ and $M_D$ are also inevitably supported in a similar manner and a relationship of $M_B = M_D = 0$ is established. In this case, however, it is impossible to keep the above fundamental formula that the sum of drag forces $M_A$, $M_B$, $M_C$, and $M_D$ is equal to the whole weight M.

Therefore, none of these drag forces $M_A$, $M_B$, $M_C$, and $M_D$ can be zero, and they must consequently be a positive value.

Thus, as shown in FIG. 16(b) in particular, the center of gravity (G) of the base plate 3 is not present inside any one of the triangles formed by the three locations. And, in such an arrangement that the center of gravity (G) is present inside a quadrangle formed by four locations, it is consequently possible to support the base plate 3 stably.

Figure 14:
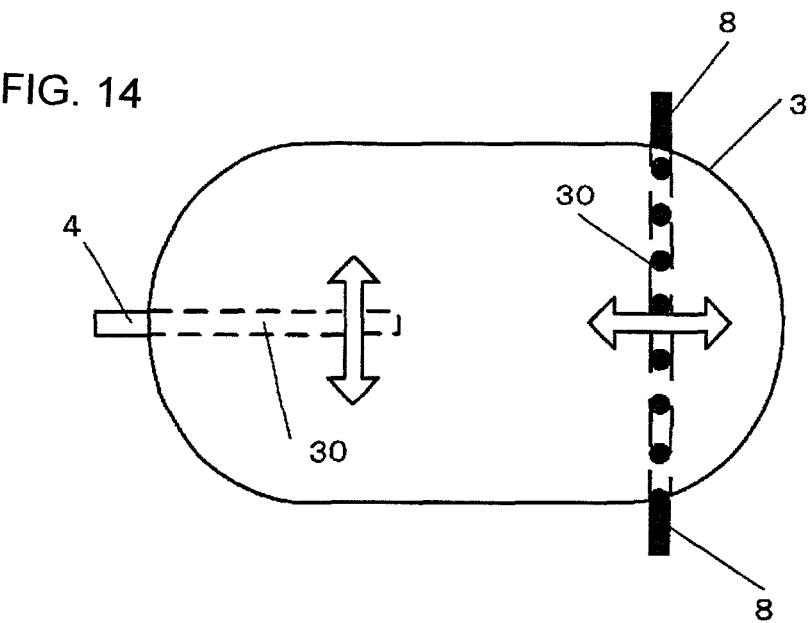
FIG. 14 is a plan view showing a working principle of the basic configuration (1).

An explanation will be made for a requirement for which the base plate 3 is prevented from moving horizontally in the basic configuration (1). As shown in FIG. 14, the requirement is that in which in the apparatus for producing a three-dimensional shaped product, the longitudinal direction of the base plate 3 is crossed at least by two extension supports 4 and/or restraining supports 8 and recesses 30 at the lower surface of the base plate 3 are fitted into these extension supports 4 and/or restraining supports 8.

Where fitted into each of the extension supports 4 and/or each of the restraining supports 8, the base plate 3 cannot move in the longitudinal direction and cannot move in other directions.

Therefore, the base plate 3 is unable to move in directions at which it is crossed by two extension supports 4 and/or restraining supports 8 in a crossed state as described above (for example, the directions indicated by the white arrows in FIG. 14), and finally the base plate 3 is completely prevented from moving in a two-dimensional planar direction by being fitted into two extension supports 4 and/or restraining supports 8.

It is noted that although the white arrows shown in FIG. 14 indicate only directions orthogonal to the longitudinal direction of the extension supports 4 and/or restraining supports 8, the base plate 3 is also unable to move obliquely.

Hereinafter, an explanation will be made for embodiments of the basic configuration (1).

Figure 5A:
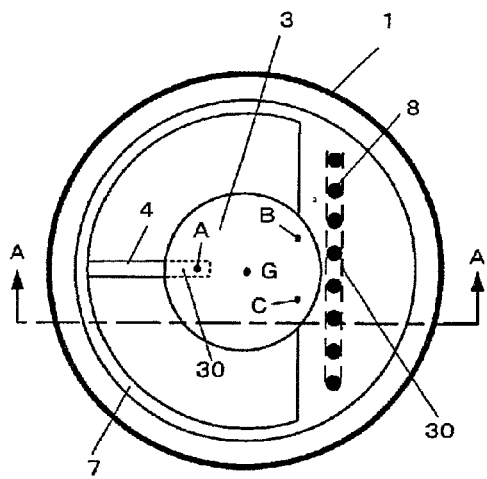
FIGS. 5(a)-5(d) explain an embodiment of the basic configuration (1) in which recesses at the lower surface of a circular base plate are fitted into an extension support and/or a restraining support.

FIG. 5(a) corresponds to an embodiment in which two extension supports 4 and/or restraining supports 8 are arranged so as to form an angle of 90 degrees with each other and recesses are fitted into two extension supports 4 and/or restraining supports 8 at the lower surface of the circular base plate 3. FIG. 5(a) shows in particular a case where two recesses 30 are fitted into one extension support 4 and one restraining support 8.

Figure 5B:
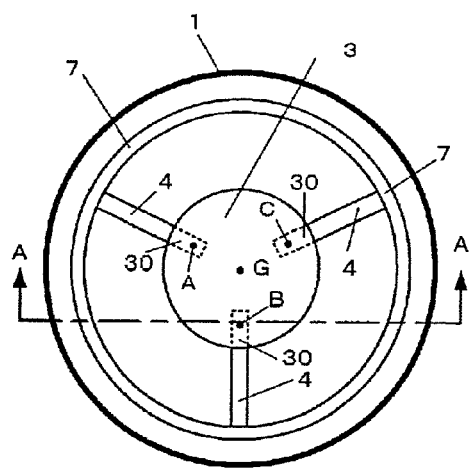
Figure 5C:
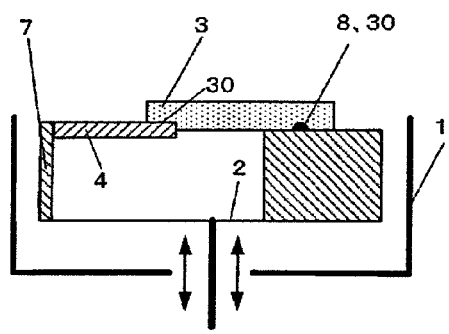
Figure 5D:
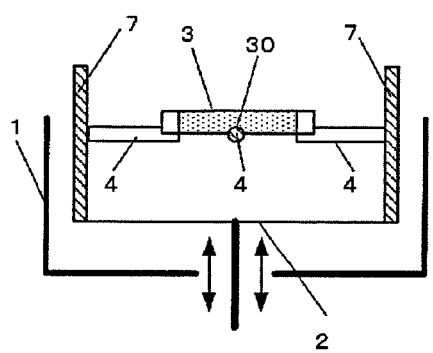

FIG. 5(b) corresponds to an embodiment in which three extension supports 4 and/or restraining supports 8 are arranged so as to form an angle of 120 degrees with each other in a mutually adjacent longitudinal direction and three recesses 30 at the lower surface of the circular base plate 3 are fitted into the three extension supports 4 and/or restraining supports 8. FIG. 5(b) shows in particular a case where the recesses 30 are fitted into only the extension supports 4.

As shown in FIGS. 5(a) and (b), in a region where the base plate 3 is supported by the extension supports 4 and restraining supports 8 via fitting to the recesses 30, the base plate can be, as a matter of course, supported by arranging the center of gravity of the base plate 3 so as to be present in a triangle ABC formed by three locations A, B, C and can be supported stably in the vertical direction.

Further, in each of the above embodiments, the base plate 3 is completely prevented from moving horizontally since it is fitted into the extension supports 4 and/or restraining supports 8. Still further, in production steps of (a), (b) and (c) described in the Description of the Related Art, the recesses 30 at the lower surface of the base plate 3 are simply fitted into the extension supports 4 and the restraining supports 8 (as shown in FIG. 5(a)) and fitted into the extension supports 4 (as shown in FIG. 5(b)), thus making it possible to support the base plate 3 stably. These embodiments are quite simple in operation because a necessity is eliminated for fixation with screws as described in Patent Document 1.

Figure 6A:
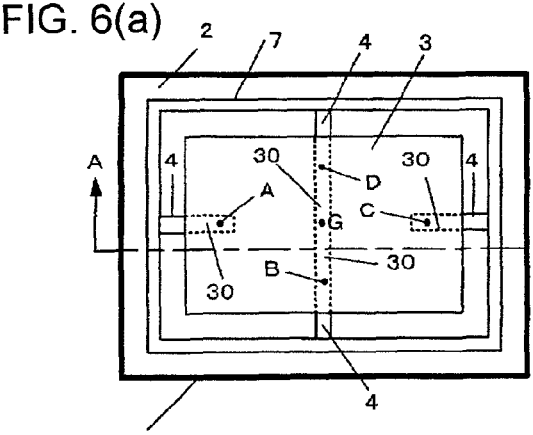
FIGS. 6(a)-6(d) explain an embodiment of the basic configuration (1) in which recesses at the lower surface of a rectangular base plate are fitted into a support and/or a restraining support.
Figure 6B:
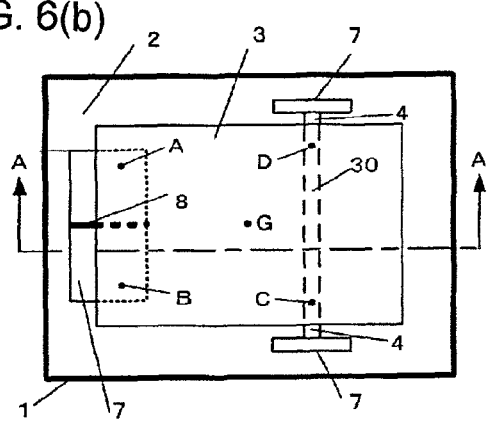
Figure 6C:
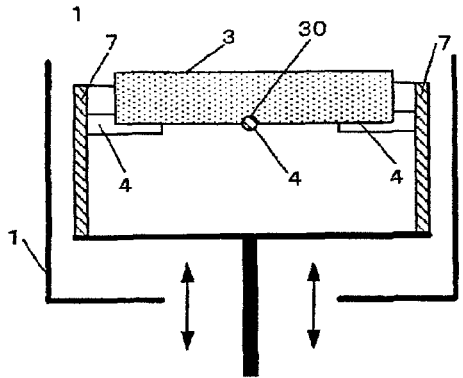
Figure 6D:
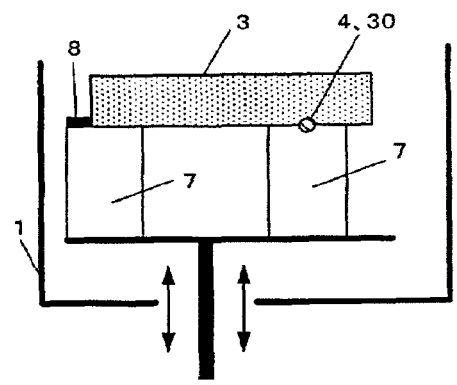

FIGS. 6(a)-6(d) correspond to an embodiment in which three to four extension supports 4 and/or restraining supports 8 are arranged so as to form an angle of 90 degrees with each other in an adjacent longitudinal direction and three or four recesses 30 at the lower surface of the rectangular base plate 3 are fitted into these extension supports 4 and/or restraining support 8. FIG. 6(a) shows in particular a case where the recesses 30 are fitted into a total of four extension supports 4 in which two sets of two extension supports 4 are opposed to each other and two extension supports of them are connected to each other. FIG. 6(b) shows in particular a case where the recesses are fitted into two extension supports 4 which are opposed to each other and one restraining support 8.

As shown in FIGS. 6(a) and (b), the base plate 3 can be supported by arrangement so that the center of gravity (G) of the base plate 3 is present inside a quadrangle ABCD formed by four locations A, B, C, and D where the base plate 3 is supported with respect to the recess 30, thereby it is possible to support the base plate 3 stably in the vertical direction.

It is noted that in the following individual embodiments (including the embodiment of the basic configuration (2)), the rectangular base plate 3 can be supported stably by the above-described arrangement exactly in the same way. Therefore, the explanation for this matter is omitted.

Figure 7A:
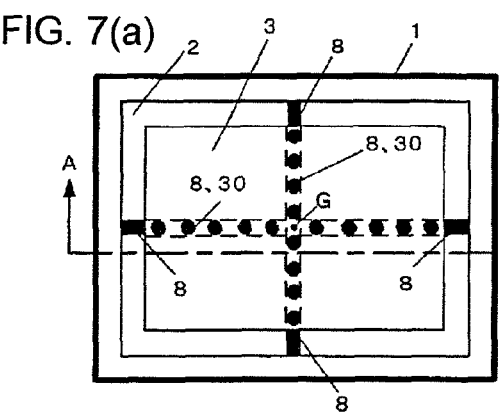
FIGS. 7(a)-7(d) explain an embodiment of the basic configuration (1) in which recesses at the lower surface of a rectangular base plate are all fitted into restraining supports.
Figure 7B:
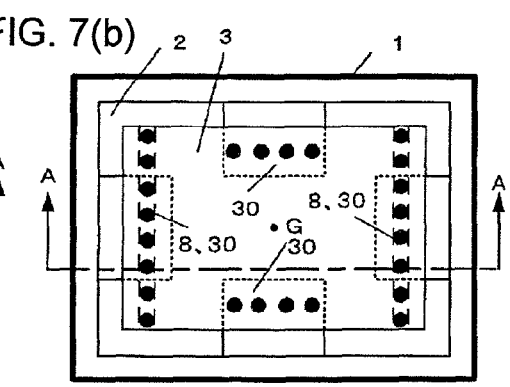
Figure 7C:
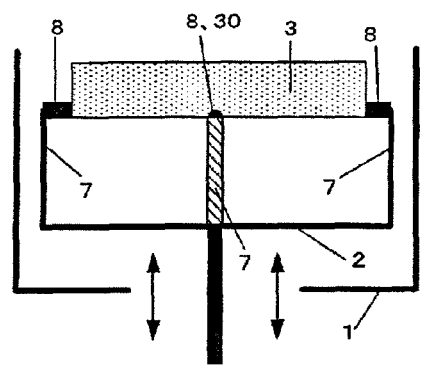
Figure 7D:
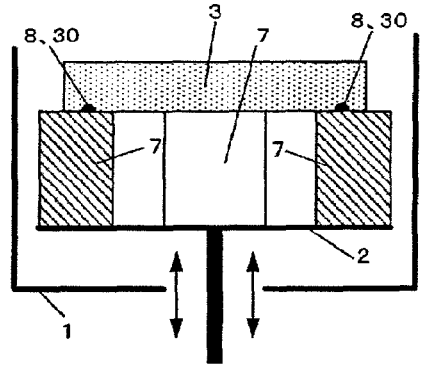

FIGS. 7(a)-7(d) correspond to an embodiment in which, similar to FIG. 6, three or four extension supports 4 and/or restraining supports 8 are arranged so as to form an angle of 90 degrees with each other in an adjacent longitudinal direction, and three or four recesses 30 at the lower surface of the rectangular base plate 3 are fitted into the extension supports 4 and/or restraining supports 8 and in particular corresponds to an embodiment where the recessed parts are all fitted into the restraining supports 8. FIG. 7(a) show in particular a case where the frame bodies 7 which are orthogonal to each other on the table 2 form a cross shape and the recesses 30 are fitted into the restraining supports 8 which are similarly crossed. FIG. 7(b) shows in particular a case where the recesses 30 are fitted into the restraining supports 8 arranged so as to be located at four rectangular sides respectively the tops of four projected frames in a state of forming similar rectangular sides in the vicinity of the horizontally surrounding parts of the base plate 3.

In the embodiment shown in FIG. 7, it is quite convenient that the base plate 3 can be stably supported not by using the extension support 4 in particular but using only the restraining supports 8 on the top of the frame body 7.

Figure 8A:
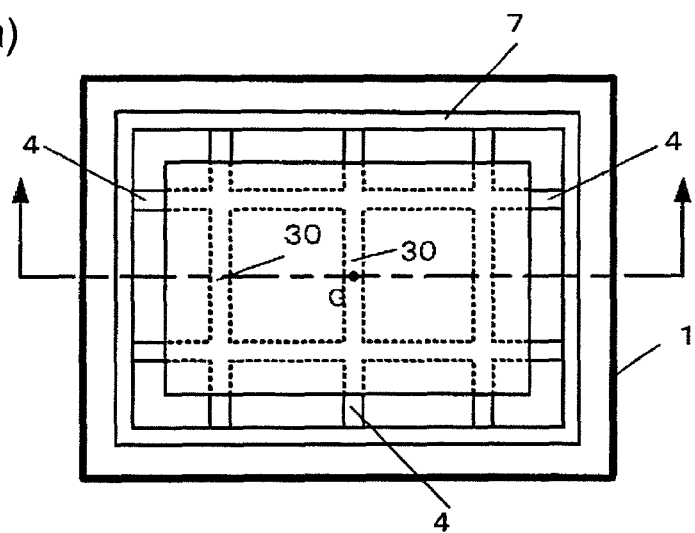
FIGS. 8(a) and 8(b) show a plan view and a side cross-sectional view including fitted portions for explaining an embodiment of the basic configuration (1) in which recesses at the lower surface of a rectangular base plate are fitted into supports in which two support groups respectively made up of two and three supports mutually opposed and also connected are arranged so as to be crossed at an angle of 90 degrees with each other.
Figure 8B:
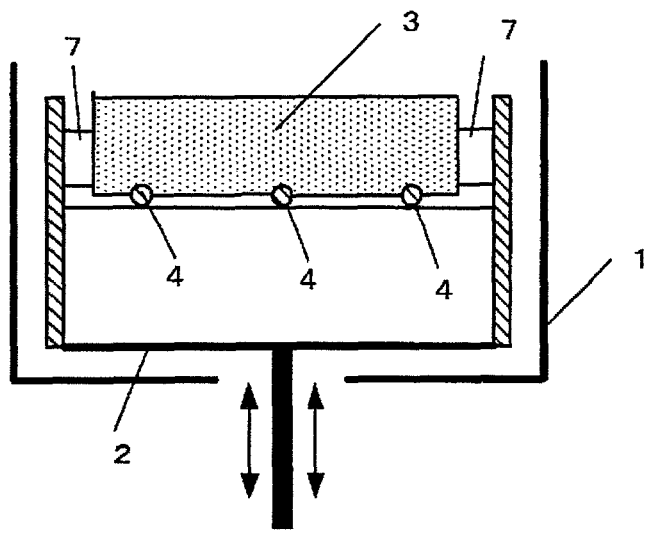

FIGS. 8(a) and 8(b) correspond to an embodiment in which two groups of two or more extension supports 4 which are opposed and also connected to each other are provided, an extension support 4 of one support group and that of the other support group are arranged so as to cross with each other at an angle of 90 degrees in the longitudinal direction, and recesses 30 arranged similarly at the lower surface of the rectangular base plate 3 are fitted into these two groups of extension supports 4 arranged as described above. FIG. 8 shows in particular a case where one group made up of three extension supports 4 is orthogonal to the other group made up of two extension supports 4.

Ordinarily, the base plate 3 often takes on a rectangular shape or in particular a square shape. However, in embodiments respectively shown in FIGS. 6, 7 and 8, the recesses 30 are fitted into the extension supports 4 and/or restraining supports 8 in parallel and also orthogonal to each other. Thereby, the base plate 3 can be supported very firmly in preventing horizontal movement.

Figure 15:
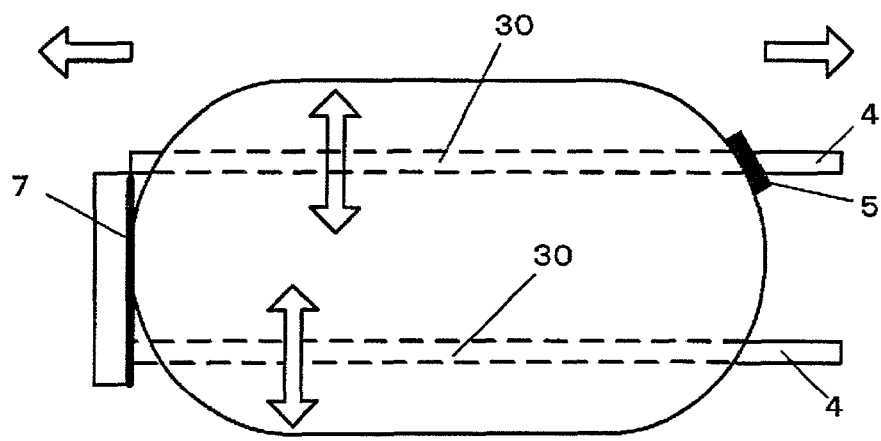
FIG. 15 is a plan view showing a working principle of the basic configuration (2).

An explanation will be made for a requirement that the base plate 3 is prevented from moving horizontally in the basic configuration (2). As shown in FIG. 15, the requirement is that in which a horizontally surrounding part of the base plate 3 is contacted with a projected part 5 provided at the support 4 on both sides in the longitudinal direction of at least one recess 30 among two recesses 30 and also projecting at least upward and/or a wall part of the projected frame.

The base plate 3 can be prevented by these requirements from moving in a direction orthogonal to the recess 30 as shown in FIG. 15. The base plate 3 is also prevented from moving horizontally along the longitudinal direction of the recess 30 on both sides in the longitudinal direction by the projected part 5 in contact with the horizontally surrounding part of the base plate 3 and/or the wall part.

Figure 12:
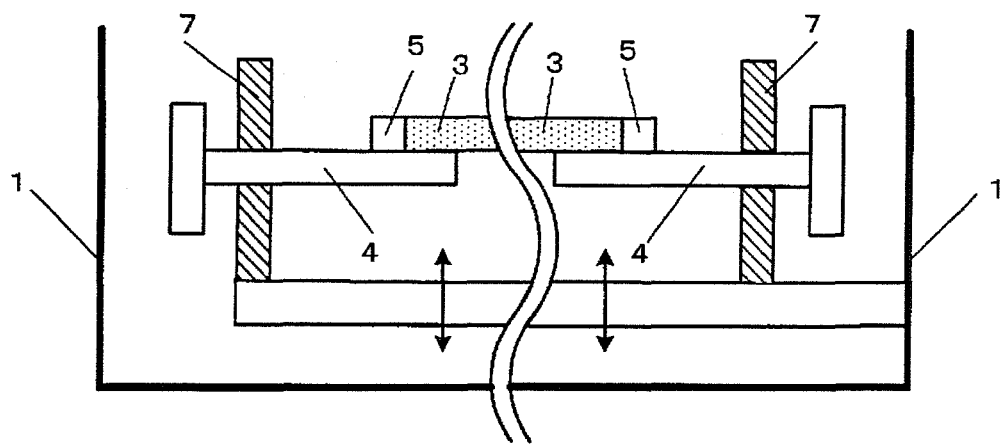
FIG. 12 is a perpendicular side cross-sectional view for explaining a state that a support is provided with a projected part projecting upward.

In particular, an explanation will be made in advance for the projected part 5. As shown in FIG. 12, the projected part 5 is required to be provided at least on the support 4 and also projected upward. This is because the projected part 5 is required to be contacted with a horizontal outer surrounding part of the base plate 3 placed on the support 4.

However, as a matter of course, such an embodiment is also adoptable as the above-described projected part 5 that projects in the whole circumferential direction in the longitudinal direction of the support 4 like a nut and a collar part.

Hereinafter, an explanation will be made for embodiments of the basic configuration (2).

Figure 9A:
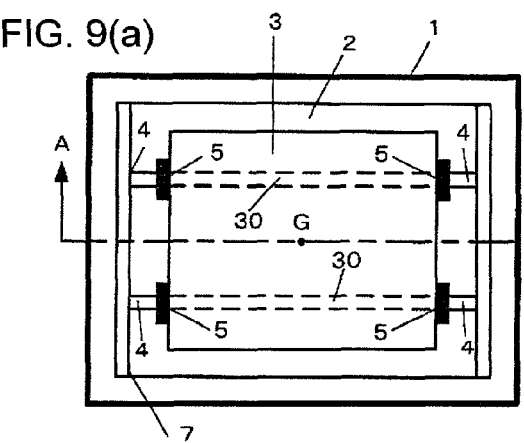
FIGS. 9(a)-9(d) explain an embodiment of the basic configuration (2) in which recesses at the lower surface of a rectangular base plate are fitted into four supports in which two mutually adjacent supports are in parallel to each other or two non-adjacent supports are opposed to each other.
Figure 9B:
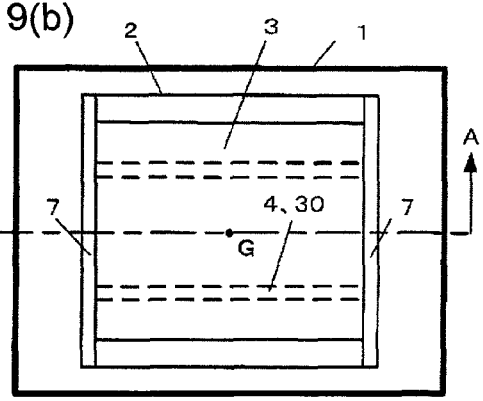
Figure 9C:
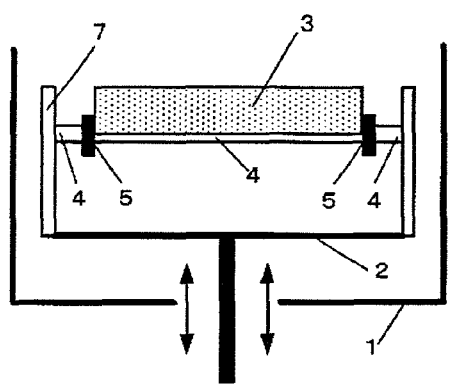
Figure 9D:
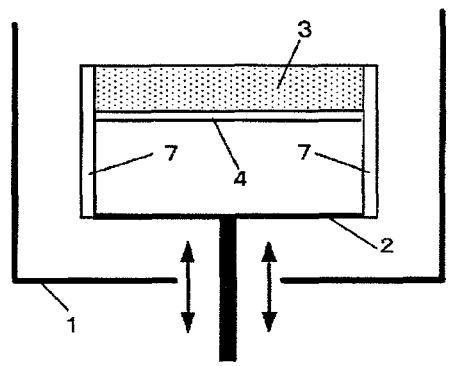

FIGS. 9(a)-9(d) correspond to an embodiment in which, among four extension supports 4, two mutually-adjacent extension supports 4 are arranged to be in parallel to each other, two non-adjacent extension supports 4 are arranged to be opposed to each other, four recesses 30 at the lower surface of the rectangular base plate 3 are fitted respectively into these extension supports 4, and the projected parts 5 provided on all the extension supports 4 or some of them and/or wall parts of the projected frame are contacted with two sides on both sides located at the horizontally surrounding parts of the base plate 3 orthogonal to the longitudinal direction of the extension supports 4. FIG. 9(a) shows in particular a case where both sides of the recesses 30 are contacted with the projected parts 5, and FIG. 9(b) shows in particular a case where both sides of the recesses 30 are contacted with the wall parts.

In the embodiment shown in FIGS. 9(a)-9(d), the base plate 3 is inserted into the projected parts 5 or the wall parts on both sides and also the recesses 30 at the lower surface of the base plate are fitted into the extension supports 4. Thereby, the base plate 3 is prevented from moving horizontally and can be supported stably.

Figure 10A:
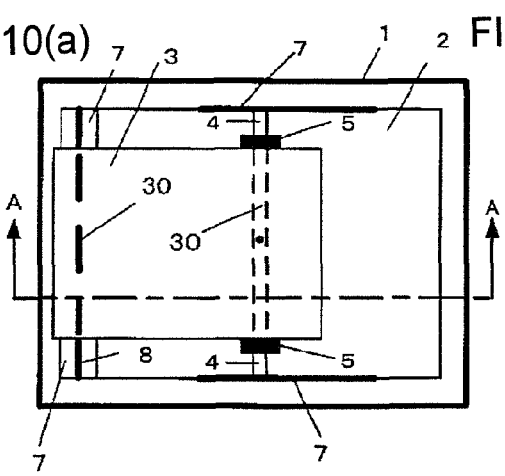
FIGS. 10(a)-10(d) explain an embodiment of the basic configuration (2) in which recesses at the lower surface of a rectangular base plate are fitted into one support and one restraining support which are in parallel to each other.
Figure 10B:
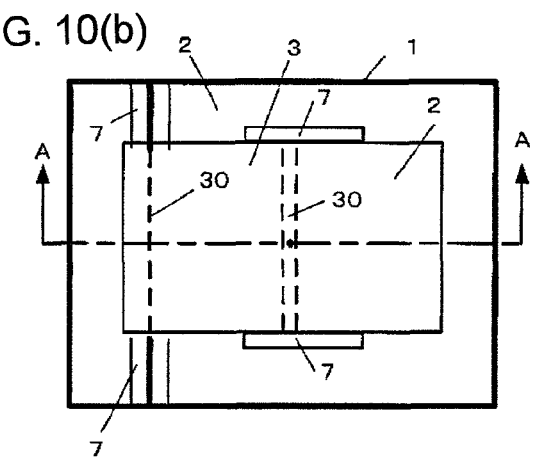
Figure 10C:
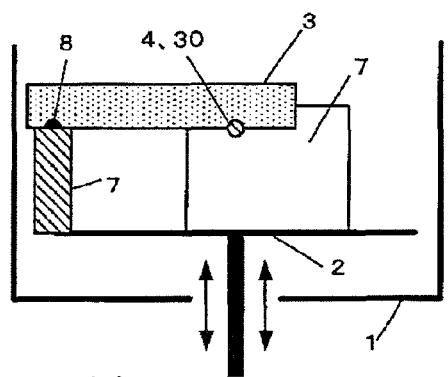
Figure 10D:
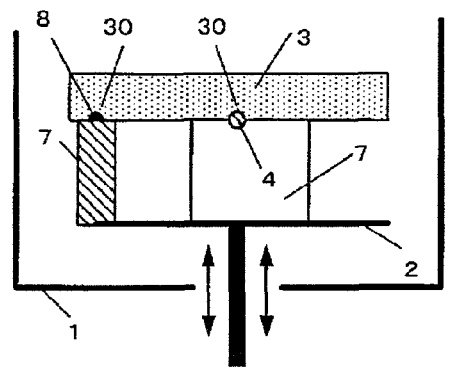

FIGS. 10(a)-10(d) correspond to an embodiment in which two extension supports 4 are arranged so as to be opposed to each other, one restraining support 8 is arranged so as to be in parallel with these two extension supports 4, two recesses 30 at the lower surface of the rectangular base plate 3 are fitted into the extension supports 4 and the restraining support 8, and the projected parts 5 provided on individual extension supports 4 and/or mutually-opposing wall parts of the projected frame at which the individual extension supports 4 are installed in a projecting manner are contacted with two sides on both sides located at the horizontally surrounding parts of the base plate 3 orthogonal to the longitudinal direction of the extension supports 4. FIG. 10(a) shows in particular a case where the base plate 3 is contacted with projected parts 5 on both sides in the longitudinal direction on the recesses 30 and FIG. 10(b) shows in particular a case where the base plate 3 is contacted with the wall parts on both sides in the longitudinal direction of the recesses 30.

In the embodiment shown in FIGS. 10(a)-10(d) as well, the base plate 3 is inserted into the projected parts 5 or the wall parts on both sides and two recesses 30 are fitted into the extension supports 4 and the restraining support 8. Thereby, the base plate 3 is prevented from moving horizontally and can be supported stably.

Figure 11A:
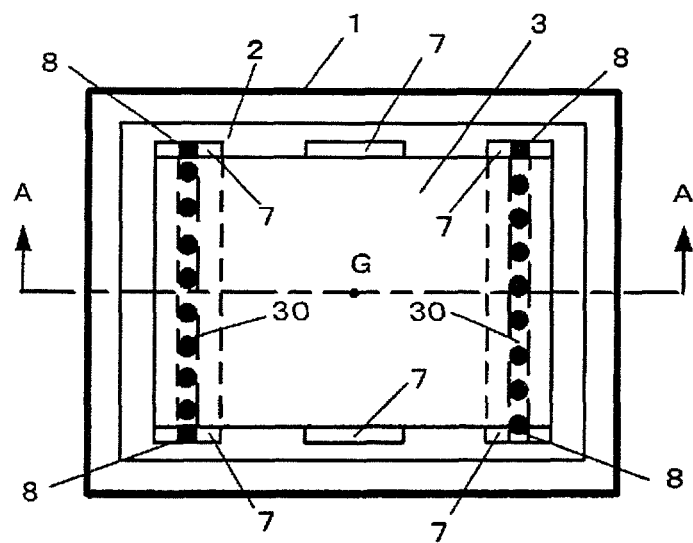
FIGS. 11(a) and 11(b) are a plan view and a side cross-sectional view including fitted portions for explaining an embodiment of the basic configuration (2) in which two recesses at the lower surface of a rectangular base plate are fitted into two restraining supports which are in parallel to each other and also, among horizontally surrounding parts of the base plate, two sides orthogonal to the restraining supports are contacted with two wall parts orthogonal to the two restraining supports.
Figure 11B:
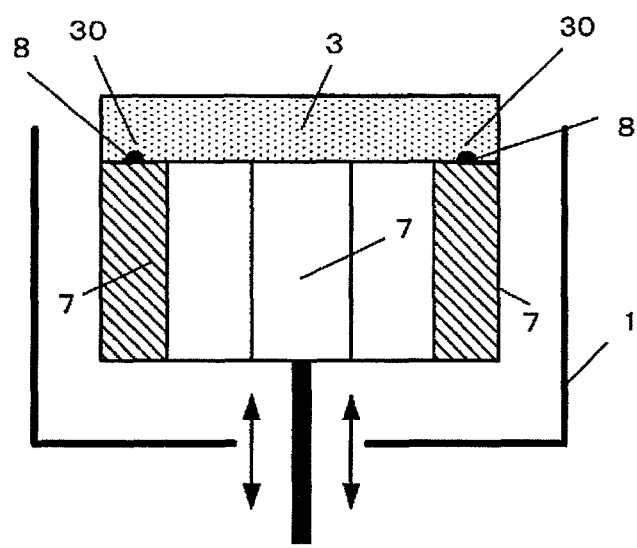

FIGS. 11(a) and 11(b) correspond to an embodiment in which two restraining supports 8 are provided in parallel on two frame bodies 7 which are opposed to each other, two recesses 30 installed at the lower surface of the rectangular base plate 3 are fitted into these two restraining supports 8, and wall parts of other two mutually-opposing frame bodies 7 are contacted with two sides on both sides located at the horizontally surrounding parts of the base plate 3 orthogonal to the two restraining supports 8. FIGS. 11(a) and 11(b) also show its specific mode.

In the embodiment shown in FIG. 11, the extension support 4 is not provided in particular but the base plate 3 is simply inserted between the wall parts and recesses 30 are also fitted into the restraining supports 8 on both sides. Thereby, it is possible to support the base plate 3 stably.

In the embodiments shown in FIG. 7(b) and FIGS. 11(a) and 11(b), the base plate 3 is supported by the restraining supports 8 on both sides. Therefore, it is not necessary to provide the projected parts 5 on the extension support 4.

The horizontally surrounding part of the base plate 3 is contacted with the wall part of the frame body 7, thereby giving a deceptive impression that the base plate 3 larger in area more than necessary would be needed.

However, in the above-described embodiment, it is not always necessary to provide the base plate 3 larger in area.

Figure 13A:
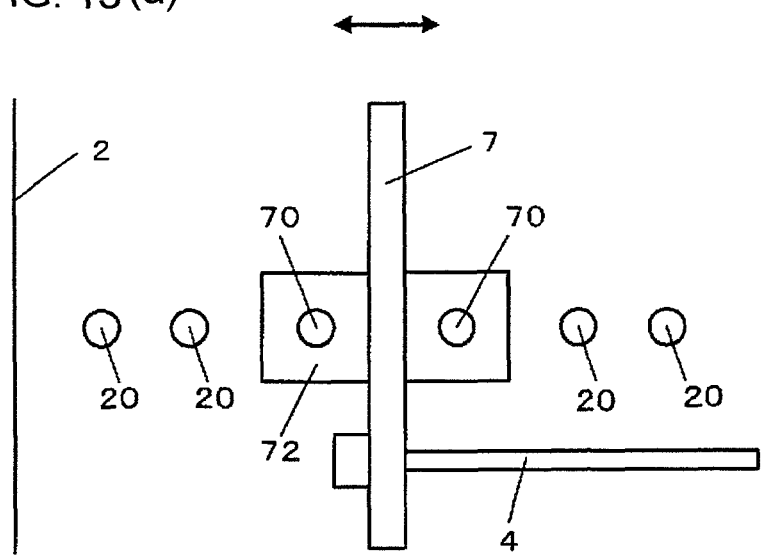
FIGS. 13(a) and 13(b) explain an embodiment in which the frame body slides freely along the surface of the table.
Figure 13B:
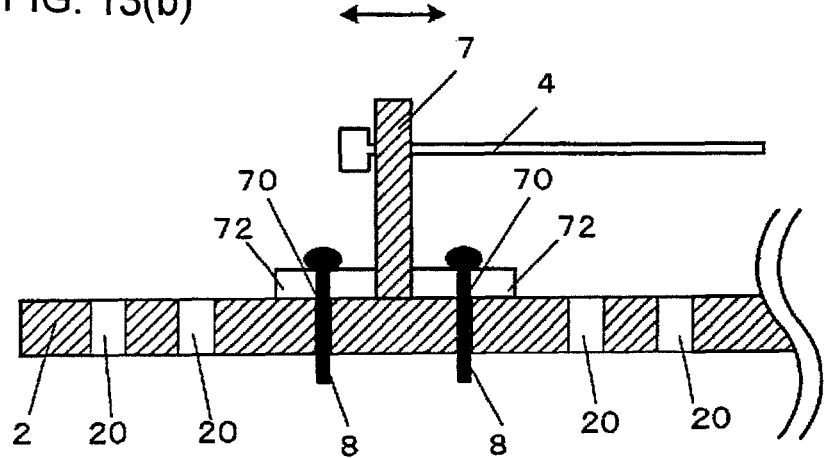

More specifically, as shown in FIGS. 13(a) and 13(b), both-side leg parts are installed in a projecting manner at the lower end of the frame body 7 in a direction in which the support 4 is installed in a projecting manner and also on the opposite side thereof, an insertion hole 20 is made on each of the both-side leg parts, a plurality of insertion holes 20 are made also on the table 2 depending on the direction in which each support 4 is installed in an projecting manner, stopping rods or stopping bolts are inserted through both insertion holes 20 for fixing individual support bodies 7 which are adjusted and selected by selecting the thus inserted locations, thereby making it possible to respond to base plates 3 in various shapes and dimensions and to adjust the location of the base plate 3 in the horizontal direction.

Powder 12 adoptable in the present invention includes metal powder, ceramic powder, resin-coated metal powder or ceramic powder or resin-coated sand.

The base plate 3 used in the basic configurations (1) and (2) is that in which the powder 12 is initially sprayed on the surface of the base plate 3 in the previously described step (a) and, the powder 12 must be adhered upon solidification of the powder 12 by sintering in the previously described step (b). As a material of the base plate 3, any material may be selected as long as it can be adhered.

Ordinarily, the same material as the previously described exemplified powder 12 is often adopted. In this case, the base plate 3 consequently configures the lowest end of a three-dimensional shaped product.

As a matter of course, in the basic configurations (1) and (2) of the present invention and in the previously described individual embodiments, the step (a) is conducted in which the powder 12 is sprayed on the surface of the base plate 3 to effect planarization, the sintering step (b) is conducted on the upper side of the base plate 3, and also the molding step (c) is conducted on the upper side, thereby producing a three-dimensional shaped product.

Conventionally, a heating plate (heater) or a cooling plate (cooler) is interposed between the table 2 and the base plate 3. In the basic configurations (1) and (2), it is, as a matter of course, possible that the heating plate (heater) or the cooling plate (cooler) is interposed between the support 4 of the base plate 3 and/or the step site (not illustrated). One of the heating plate and the cooling plate may be selected depending on shaping conditions.

EXAMPLES

Hereinafter, an explanation will be made by referring to examples.

Example 1

Example 1 is characterized in that, as shown in FIG. 1, a powder supporting plate 9 is installed between a region into which the recessed part of the base plate 3 is not fitted and the top of the frame body 7 with which the horizontally surrounding part is not in contact among supports 4.

Figure 1B:
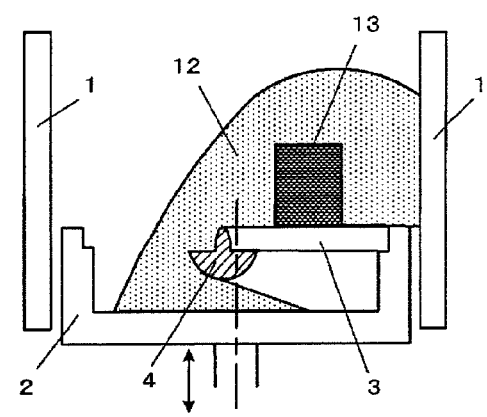
Figure 1C:
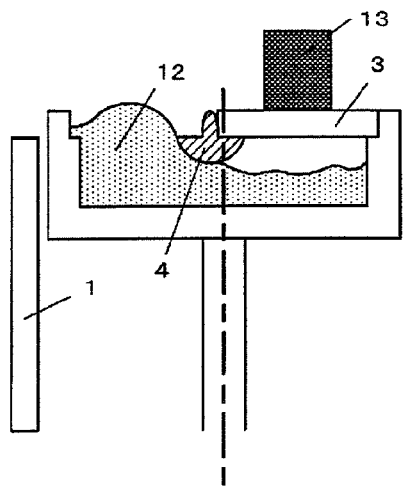
Figure 1D:
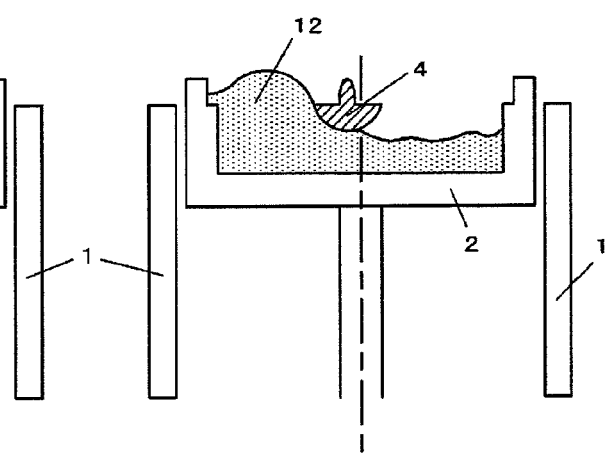

As described in Example 1, as shown in FIG. 1(b), the powder supporting plate 9 is removed from the state shown in FIG. 1(a). Thereby, as shown in FIGS. 1(c) and (d), the powder 12 is loaded inside a space formed by the table 2 and the frame body 7, and the table 2 is then moved above, thus making it possible to discharge the powder 12 outside a container.

Example 2

Figure 2:
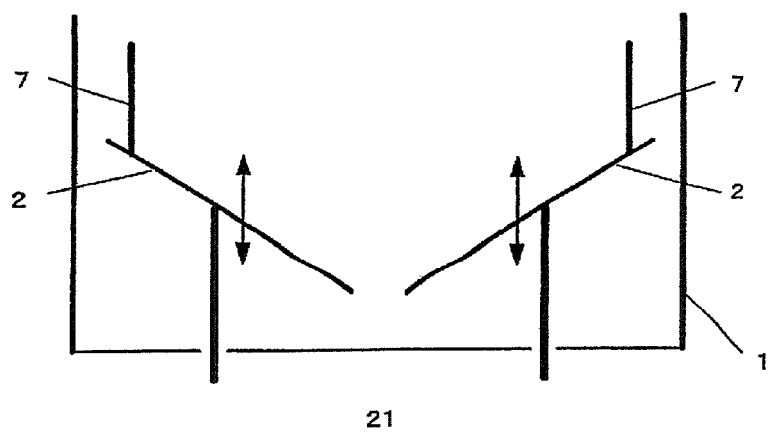
FIG. 2 is a perpendicular cross-sectional view showing a configuration of the table of Example 2 (a support or a projected part is not illustrated here).

Example 2 is characterized in that, as shown in FIG. 2, on the table 2, an inclined state sequentially lowering at a whole region inside a location supporting the frame body 7 or at a region further inside away from the location is formed, and a discharge opening 21 is provided at the lower end in the inclined table for discharging the powder 12 which has not been sintered.

Where the powder 12 is loaded on the table 2 and the surface of the base plate 3 or loaded on the surface of the base plate 3, all the powder 12 is not necessarily subjected to sintering. Further, as shown in Example 1, as a matter of course, the powder 12 remaining on the powder supporting plate 9 is not subjected to sintering and shaping.

In this case, after the shaped article 13 is taken out from the table 2 together with the base plate 3, the powder 12 which has not been sintered remains consequently at the lower part of the table 2.

In Example 2, the remaining powder 12 lowers along the lower part of the inclined table and can be discharged through an opening located at the lowest part into the lower part of a shaping tank 1. Then, it is possible to reuse the powder 12.

A region in which the above inclined state is provided may include not only a whole region inside a location at which the frame body 7 is installed upright but also a whole region further inside away from the location. This is because in the embodiments shown in FIG. 7(b) and FIGS. 11(a) and 11(b), where a location for fixing the frame body 7 can be selected depending on the direction in which the support 4 comes into contact as shown in FIGS. 13(a) and 13(b), it is necessary that the table 2 is in a planar shape from a location where the frame body 7 is installed in a projecting manner to a predetermined inside region.

Example 3

Figure 3:
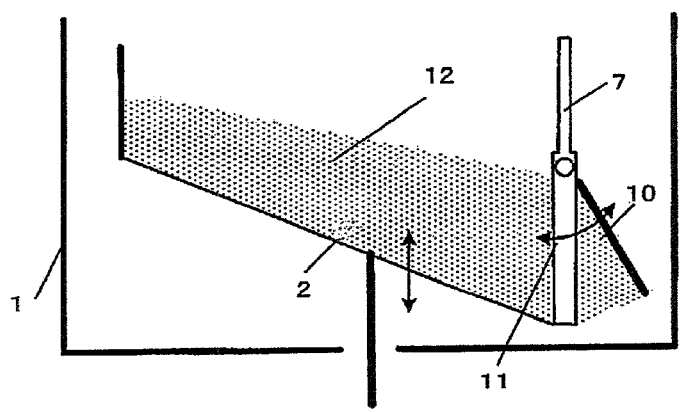
FIG. 3 is a perpendicular cross-sectional view showing a configuration of the table of Example 3 (the support or the projected part is not illustrated here).

As shown in FIG. 3, Example 3 is characterized in that, on the table 2, an inclined state sequentially lowering from one end to the other end which are opposed to each other at a whole region inside a location for supporting the frame body 7 or at a region further inside away from the location, the frame body 7 is supported via two perpendicular supports 11 at the other end, and between the two perpendicular supports 11, provided is an opening/closing plate 10 capable of rotationally moving either the upper end position sandwiched by the two perpendicular supports 11 or these two perpendicular supports 11.

Similar to Example 2, also in Example 3, the powder 12 which has not been sintered or shaped is allowed to fall on the table 2 and the opening/closing plate 10 located between the perpendicular supports 11 is opened, thus making it possible to discharge the powder 12 from the surface of the table 2 to the outside. Then, similar to Example 2, it is possible to discharge the powder 12 to the outside effectively and reuse the powder 12. (It is noted that FIG. 3 shows a state that the opening/closing plate 10 moving rotationally is kept opened at the upper ends of two perpendicular supports 11 but at a stage where shaping is performed, as a matter of course, the opening/closing plate 10 is located between the perpendicular supports 11 and kept closed.)

In Example 3 as well, a region having the inclined state includes a whole region further inside away from a location where the frame body 7 is installed upright. The grounds thereof are the same as that described in Example 2.

Example 4

Figure 4:
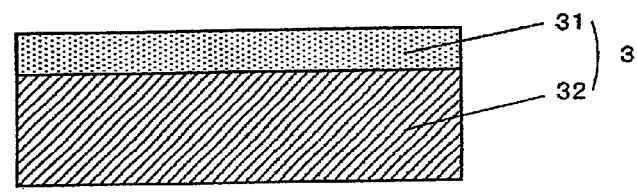
FIG. 4 is a perpendicular cross-sectional view showing a configuration of the base plate of Example 4.

As shown in FIG. 4, Example 4 is characterized in that, a molded layer made of powder 12 which is the same material as the powder 12 forming a three-dimensional shaped product is firmly adhered on an upper part 31 of a metal plate 32 configuring a part of the base plate 3.

As described above, adopted is a material which is the same material as the powder 12 forming a three-dimensional shaped product on the metal plate 32. Thereby, upon solidification of the powder 12 in the sintering step (b), the powder 12 can be firmly adhered.

The molded layer forms the lowest layer of the three-dimensional shaped product and also cuts the metal plate 32 located at the lowest end after completion of shaping.

By this cutting, the metal plate 32 is able to form a part of the surface of the base plate 3 in a subsequent metal step.

EFFECTS OF THE INVENTION

In the present invention, on the basis of the basic configurations (1) and (2), a frame body is interposed between a base plate and a table to form a vertical space therebetween, thermal conduction from the base plate to the table is prevented, a powder material can be efficiently adhered on the base plate, further, the base plate is easily placed on a support and/or a step portion without being accompanied by fixation of a bolt from the table side, and a horizontally surrounding part of the base plate comes into contact with the projected part and/or an inner wall of the frame body, thereby preventing the base plate from moving horizontally, making it possible to install the base plate stably.

Further, where the base plate is installed as described above, it is not necessary to insert a bolt as described in Patent Document 1. Thus, where the base plate is used as a configuration part at the lower end of an object to be shaped, there is no chance that a hole remains due to insertion of the bolt. Further, since the vertical space is present between the table and the base plate, the need for facilities for cooling the base plate which has been heated on the table as disclosed in Patent Document 1 is eliminated.

Still further, in the configuration disclosed in Patent Document 1, the table is consequently required to be planar. However, in the above-described basic configuration, as described in Example 2 and Example 3, an inclined state is developed on the table, thus making it possible to adopt a configuration capable of easily discharging powder which has not been sintered.

The present invention is applicable to any and all configurations of an apparatus for producing a three-dimensional shaped product using a baseplate.

What is claimed is:

1. An apparatus for producing a three-dimensional shaped product, comprising:
a shaping tank,
a vertically movable table in the shaping tank, the vertically movable table having an upper surface,
a frame body installed upright on the table,
at least one of:
at least one extension support projecting outwardly from the frame body, and
at least one restraining support provided on top of the frame body,
a base plate which supports a metallic or non-metallic powder material, the base plate having a lower surface and recesses provided at the lower surface of the base plate, the recesses receiving at least two supports selected from the group of said at least one extension support and said at least one restraining support such that the base plate is supported on the at least two supports,
the base plate adapted to be supported by an arrangement so that a center of gravity of the base plate is present inside one of:
a triangle formed by three locations and
a quadrangle formed by four locations inside a region in which the base plate is supported,
on opposite sides of at least one said recess in a longitudinal direction of said at least one said recess, at least one of:
a projected part which extends upwardly from at least one said extension support and contacts an outer circumferential wall of the base plate,
a wall part of the frame body which contacts an outer circumferential wall of the base plate,
thereby preventing the base plate from moving horizontally,
wherein the following steps are sequentially repeated:
spraying one of the metallic and non-metallic powder on a surface of the base plate, with the surface of the base plate having at least a material which can be adhered to the metallic or non-metallic powder upon solidification of the powder by sintering,
subjecting an upper surface of the thus sprayed powder to planarization,
irradiating one of electromagnetic waves and electron beams along a layer of the powder having a predetermined thickness to a region to be shaped which is located at an uppermost position, thereby forming a sintered layer, and
cutting at least one of an end part and upper surface where sintering has been performed to effect molding.

2. The apparatus for producing a three-dimensional shaped product according to claim 1, wherein,
said at least two supports include four supports,
two mutually-adjacent supports of said four supports are arranged to be in parallel to each other,
while two non-adjacent supports of said four supports are arranged to be opposed to each other,
the base plate is rectangular,
there are four said recesses provided at the lower surface of the rectangular base plate and which are individually fitted onto the supports, and
at least one of:
projected parts provided on all the extension supports,
projected parts provided on some of the extension supports and
wall parts of the projected frame are in contact with two opposite sides located at the outer circumferential wall of the base plate orthogonal to a longitudinal direction of the extension supports.

3. The apparatus for producing a three-dimensional shaped product according to claim 1, wherein two said extension supports are arranged so as to be opposed and also connected to each other,
one restraining support is arranged so as to be in parallel with these two extension supports,
the base plate is rectangular,
two recesses at the lower surface of the rectangular base plate are fitted onto the extension supports and the restraining support, and
at least one of:
projected parts provided individually on the extension supports and
mutually opposing wall parts of the projected frame at which the individual supports are installed in a projecting manner
are in contact with two opposite sides located at the outer circumferential wall of the base plate orthogonal to a longitudinal direction of the extension supports.

4. The apparatus for producing a three-dimensional shaped product according to claim 1, wherein
two restraining supports are provided in parallel on two frame bodies which are opposed to each other,
the base plate is rectangular,
two recesses at the lower surface of the rectangular base plate are fitted onto these two restraining supports, and
wall parts of other two mutually-opposing frame bodies are in contact with two opposite sides located at the outer circumferential wall of the base plate orthogonal to the two restraining supports.

* * * * *